United States Patent
Otsubo et al.

(12)

(10) Patent No.: US 6,507,000 B2
(45) Date of Patent: Jan. 14, 2003

(54) LASER DRILLING MACHINE AND METHOD FOR COLLECTING DUST

(75) Inventors: Tatsuhiro Otsubo, Miki (JP); Hiroyuki Naka, Osaka (JP); Naoko Matsuda, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 68 days.

(21) Appl. No.: 09/853,008

(22) Filed: May 10, 2001

(65) Prior Publication Data

US 2001/0040149 A1 Nov. 15, 2001

(30) Foreign Application Priority Data

May 12, 2000 (JP) .................................... 2000-140773

(51) Int. Cl.[7] .............................................. B23K 26/36
(52) U.S. Cl. .................................................. 219/121.7
(58) Field of Search ....................... 219/121.6, 121.67, 219/121.68, 121.69, 121.7, 121.71, 121.72, 121.84, 121.85

(56) References Cited

U.S. PATENT DOCUMENTS 6,388,228 B1 * 5/2002 Lai

FOREIGN PATENT DOCUMENTS

JP          11254176 A  *  9/1999

* cited by examiner

Primary Examiner—Samuel M. Heinrich
(74) Attorney, Agent, or Firm—Jordan and Hamburg LLP

(57) ABSTRACT

A dust collector for a laser drilling machine is provided between a lens table and a workpiece to be processed and includes an upper inlet port and a lower inlet port arranged on one side of a space defined by four side walls, and an exhaust port arranged opposite the inlet ports. The total amount of air supplied from the two inlet ports is 30 to 70% of the exhaust rate. The lower inlet port has an air supply capacity 1.5 to 4.5 times that of the upper inlet port.

21 Claims, 1 Drawing Sheet

LASER DRILLING MACHINE AND METHOD FOR COLLECTING DUST

The present disclosure relates to subject matter contained in priority Japanese Patent Application No. 2000-5140773, filed on May 12, 2000, the contents of which is herein expressly incorporated by reference in its entirety.

BACKGROUND OF THE INVENTION

1. Technical Field of the Invention

The present invention relates to a laser drilling machine having a dust collector and a method for collecting dust in the laser drilling machine.

2. Description of Related Art

Laser drilling machine is used for forming a minute hole having a diameter of about 100 μm to several 10 μm in a workpiece by burning off a portion of the workpiece with a laser beam. The drilling process produces smoke and dust and the minute particles of dust are scattered around, deteriorating the working environment. Dust adhered to the lens of the laser emitter induces chemical reaction with the lens and decreases working efficiency.

Dust produced during the drilling, therefore, must be removed immediately. A conventional technique commonly known as "push-pull method" involves supplying air into a space between the lens and the workpiece from one side and exhausting air from the other side of the space, thereby collecting the minute particles of dust.

The dust-collecting performance by this push-pull method is variable depending on the positions of the air inlet and outlet and the air supply/exhaust capacity. Particularly when the design of the laser drilling machine does not permit a closed space to be formed between the lens and the workpiece because of the allowance for free relative movements of the lens and the workpiece, sufficient dust collecting performance cannot be expected simply by supplying and exhausting air in view of the clearance in the space. As a result, dust is inevitably deposited on the workpiece or on the lens, contaminating or altering the characteristics of same.

SUMMARY OF THE INVENTION

The present invention has been devised in light of the above-described problem encountered by the prior art, and it is an object of the invention to provide a dust collector for a laser drilling machine which enables efficient discharge of dust by a draft of air flowing from an air inlet toward an outlet.

To achieve the object, the present invention provides a dust collector used in a laser drilling machine arranged between a lens table and a workpiece to be processed. The dust collector includes four side walls for defining therein a space, an upper inlet port and a lower inlet port for introducing air into the space provided in one of the four side walls, the lower inlet port being capable of supplying air in an amount 1.5 to 4.5 times more than that supplied by the upper inlet port, and an exhaust port for exhausting air from the space provided in one of the four side walls opposite the upper inlet port and the lower inlet port, wherein the upper inlet port and the lower inlet port altogether have an air supply capacity which is 30 to 70% of the amount of air exhausted from the exhaust port.

A plurality of flow adjusting grooves are formed on lower faces of a pair of side walls located on both sides of a draft of air flowing from the upper inlet port and the lower inlet port toward the exhaust port. The flow adjusting grooves should preferably be inclined inwards to the draft of air at an angle of 20° to 50°.

The dust collector further includes a closure member for closing a gap formed between the lower surface of the side wall in which the exhaust port is provided, the closure member having its distal end being positioned within the space and a surface inclined upwards toward the exhaust port. The dust collector further includes an upper side wall above the space around the lens table such as to face an outer wall of the lens table with a gap of 1 mm or less over a vertical length of 15 mm or more.

These and other objects and characteristics of the present invention will become further clear from the following description with reference to the accompanying drawings.

DETAILED DESCRIPTION OF THE PREFERRED EMBODIMENTS

Figure 1:
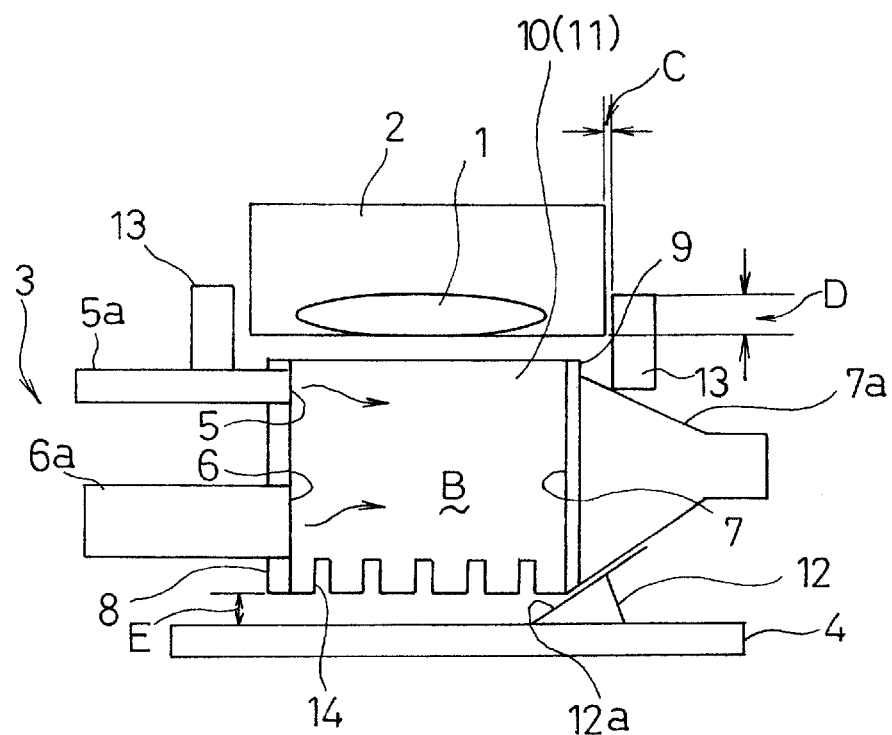
FIG. 1 is a schematic cross-sectional view showing a dust collector for a laser drilling machine according to one embodiment of the invention.
Figure 2:
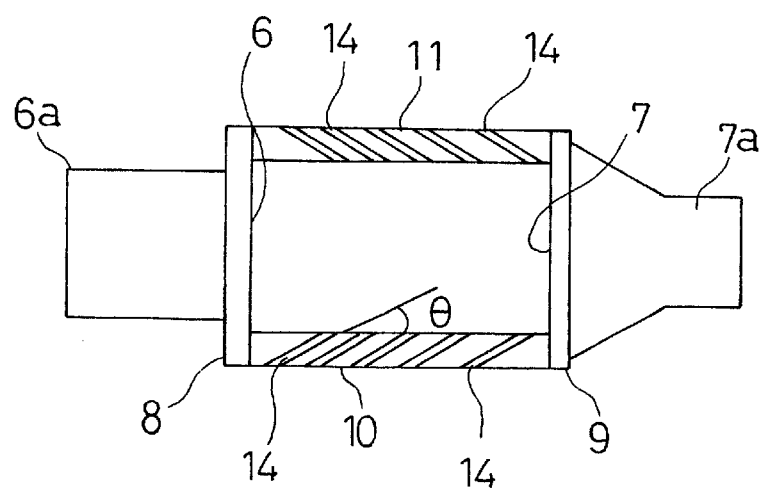
FIG. 2 is a schematic bottom plan view showing the dust collector.

A laser drilling machine and a dust collector used therein according to one embodiment of the present invention will be hereinafter described with reference to the accompanying drawings.

The laser drilling machine includes a lens 1 for focusing laser beams, a lens table 2 for moving the lens 1 upwards and downwards to effect focusing by the lens, and a dust collector 3 arranged between the lens table 2 and a workpiece 4 for collecting dust produced during the drilling process. The workpiece 4 is transferred by a known mechanism (not shown) which is capable of moving the workpiece horizontally, and positioned at a predetermined location. Laser beams from a laser emitter are focused by the lens 1 for drilling a hole in the workpiece 4.

The dust collector 3 is disposed between the lens table 2 thereabove and the workpiece 4 therebelow. The dust collector 3 includes an upper air inlet duct 5a connected to an upper inlet port 5, a lower air inlet duct 6a connected to a lower inlet port 6, an exhaust duct 7a connected to an exhaust port 7 arranged opposite the upper and the lower inlet ports 5, 6 with a space B therebetween, and four side walls 8, 9, 10, and 11 defining therein the space B.

The side wall 8 has the upper and the lower inlet ports 5, 6 formed therein, the side wall 9 has the exhaust port 7 formed therein, and the other two side walls 10, 11 are positioned opposite each other on both sides of a draft of air flowing from the inlet ports 5, 6 toward the exhaust port 7. The exhaust duct 7a has a flange and this serves as the side wall 9 in the illustrated example. Between these side walls 8 to 11 and the workpiece 4 is formed a gap E required for allowing free movements of the workpiece 4.

The total amount of air supplied from the upper and the lower inlet ports 5, 6 is set about 30 to 70% of the amount of air discharged from the exhaust port 7. In this way, dust produced during the laser drilling is efficiently removed by the induced draft flowing from the upper and lower inlet ports 5, 6 on the upstream side toward the exhaust port 7 on the downstream side.

The upper inlet port 5 is located near the lens table 2, while the lower inlet port 6 is located near the workpiece 4.

The lower inlet port 6 is capable of supplying air in an amount from 1.5 to 4.5 times that of the upper inlet port 5. Such upper inlet port 5 provided above the lower inlet port 6 creates an air current from itself towards the exhaust port, thereby preventing the draft of air formed by the lower inlet port 6 from being diffused, in view of the larger capacity of air supply thereof that is 1.5 to 4.5 times that of the upper inlet port 5. The provision of the upper inlet port 5 thus enables removal of dust to be achieved efficiently.

To be specific, the exhaust rate is set about 1 m$^3$/min, while air is supplied from the upper inlet port 5 at a rate of 0.1 m$^3$/min, and from the lower inlet port 6 at a rate of 0.3 m$^3$/min in this embodiment. The upper surface of the workpiece 4 is distanced by a length 100 mm from the lower surface at the bottom dead center of the lens table 2, and the space B is about 100 mm×100 mm in width and length. The upper inlet port 5 and the lower inlet port 6 have a rectangular shape with the dimensions of about 3 mm×100 mm and 24 mm×100 mm, respectively. The exhaust port 7 is formed in a circular shape having an inner diameter of about 48 mm.

The exhaust rate mentioned above equals to the capacity of admitting and exhausting air 1000 times per minute, and it may be variously set in accordance with the amount of dust produced during the process or a required degree of cleanness of the space B. The rates and the dimensions specified above have individual effects and contribute individually to the enhancement of dust-collecting performance.

The pair of side walls 10, 11 parallel to and opposite each other with respect to the draft of air flowing from the upper and the lower inlet ports 5, 6 toward the exhaust port 7 are provided with a plurality of flow adjusting grooves 14 in their lower faces. These grooves 14 are inclined at 20° to 50° to the direction of the air current and have a depth of about 10 mm and a width of about 5 mm. In the illustrated embodiment, five each of evenly spaced flow adjusting grooves 14 are formed obliquely at 30 in the side walls 10, 11. The number and the design of the flow adjusting grooves may be variously changed as required.

As mentioned above, a gap E is provided between the lower faces of the side walls 10, 11 and the workpiece 4 for allowing the workpiece 4 to move freely, and air may be drawn in from outside through this gap E. However, such air is drawn into the space B as being oriented inwards toward the exhaust port due to the flow adjusting grooves 14 obliquely arranged as described above. Accordingly, the dust-collecting performance is hardly affected by the air entering from outside.

Between the lower face of the exhaust duct 7a and the workpiece 4 is detachably inserted a closure member 12 such as not to interfere with the movement of the workpiece 14. The closure member 12 has a surface 12a inclined upwards toward the exhaust port 7, with its distal end being inserted into the space B, thereby closing one side of the gap E.

By providing such closure member 12 to close the gap E on the side of the exhaust port 7, no air flows into the space B in an opposing direction, preventing disturbance of the draft of air created in the space B. The inclined surface 12a of the closure member 12 causes the air current to flow smoothly toward into the exhaust port 7. Above and around the four side walls 8 to 10 defining therein the space B is additionally provided an upper side wall 13 such as to face the outer face of the lens table 2 with a gap C of about 1 mm or less over a vertical length D of about 15 mm or more.

The lens 1 needs to be moved upward and downward for the focusing purpose and therefore there is formed a gap between the lower face of the lens table 2 and the top end of the space B. The upper side wall 13 is provided for surrounding such gap to prevent any air from entering from outside which may collide with and disturb the air current in the space B. The gap between the lens table 2 and the space B is reduced to ⅙ of the prior art due to such upper side wall 13, whereby disturbance of the draft of air within the space B caused by air flowing in through the gap is prevented, while the lens table 2 is freely movable in vertical directions.

Thus the dust collector of the invention creates a smooth draft of air from the air inlet side toward the exhaust side which is hardly disturbed by air flowing in from the outside, thereby ensuring high dust-collecting performance.

The dust collector and the laser drilling machine should not necessarily be designed as specified above. For example, another dust collector having a structure similar to that described above may be additionally provided below the workpiece.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A laser drilling machine having a dust collector arranged between a lens table and a workpiece to be processed, comprising:
    four side walls for defining therein a space;
    an upper inlet port and a lower inlet port for introducing air into the space provided in one of the four side walls, the lower inlet port being capable of supplying air in an amount larger than an amount of air supplied by the upper inlet port; and
    an exhaust port for exhausting air from the space, provided in one of the four side walls opposite the upper inlet port and the lower inlet port.

2. The laser drilling machine according to claim 1, wherein a plurality of flow adjusting grooves are formed on lower faces of a pair of side walls located on both sides of a draft of air flowing from the upper inlet port and the lower inlet port toward the exhaust port.

3. The laser drilling machine according to claim 2, wherein the flow adjusting grooves are inclined inwards to the draft of air at an angle of 20° to 50°.

4. The laser drilling machine according to claim 1, further comprising a closure member for closing a gap formed between a lower surface of the side wall in which the exhaust port is provided, the closure member having its distal end being positioned within the space and a surface inclined upwards toward the exhaust port.

5. The laser drilling machine according to claim 1, further comprising an upper side wall above the space around the lens table such as to face an outer wall of the lens table with a gap of 1 mm or less over a vertical length of 15 mm or more.

6. The laser drilling machine according to claim 1, wherein the amount of air supplied by the lower inlet port is 1.5 to 4.5 times more than the amount of air supplied by the upper inlet port.

7. The laser drilling machine according to claim 6, wherein the upper inlet port and the lower inlet port altogether have the air supply capacity which is 30 to 70% of the amount of air exhausted from the exhaust port.

8. The laser drilling machine according to claim 1, wherein the exhaust port is capable of exhausting air in an amount larger than an air supply capacity of both of the upper inlet port and the lower inlet port.

9. The laser drilling machine according to claim 8, wherein the upper inlet port and the lower inlet port altogether have the air supply capacity which is 30 to 70% of the amount of air exhausted from the exhaust port.

10. A laser drilling machine having a dust collector arranged between a lens table and a workpiece to be processed, comprising:

four side walls for defining therein a space;

an upper inlet port and a lower inlet port for introducing air into the space provided in one of the four side walls; and an exhaust port for exhausting air from the space, provided in one of the four side walls opposite the upper inlet port and the lower inlet port, the exhaust port being capable of exhausting air in an amount larger than an air supply capacity of both of the upper inlet port and the lower inlet port.

11. The laser drilling machine according to claim 10, wherein a plurality of flow adjusting grooves are formed on lower faces of a pair of side walls located on both sides of a draft of air flowing from the upper inlet port and the lower inlet port toward the exhaust port.

12. The laser drilling machine according to claim 11, wherein the flow adjusting grooves are inclined inwards to the draft of air at an angle of 20° to 50°.

13. The laser drilling machine according to claim 10, further comprising a closure member for closing a gap formed between a lower surface of the side wall in which the exhaust port is provided, the closure member having its distal end being positioned within the space and a surface inclined upwards toward the exhaust port.

14. The laser drilling machine according to claim 10, further comprising an upper side wall above the space around the lens table such as to face an outer wall of the lens table with a gap of 1 mm or less over a vertical length of 15 mm or more.

15. The laser drilling machine according to claim 10, wherein the lower inlet port is capable of supplying air in amount larger than an amount of air supplied by the upper inlet port.

16. The laser drilling machine according to claim 15, wherein the amount of air supplied by the lower inlet port is 1.5 to 4.5 times more than the amount of air supplied by the upper inlet port.

17. The laser drilling machine according to claim 10, wherein the upper inlet port and the lower inlet port altogether have an air supply capacity which is 30 to 70% of the amount of air exhausted from the exhaust port.

18. A method for processing a workpiece by a laser drilling machine while collecting dust, comprising:

providing a substantially closed space between a lens table and a workpiece to be processed;

supplying air into the space from one side toward the other side thereof for creating a first draft of air;

supplying air for creating a second draft of air parallel to and below the first draft of air in an amount larger than that supplied for creating the first draft of air; and exhausting air from the space from one side thereof downstream of the first draft of air and the second draft of air.

19. The method according to claim 18, wherein the second draft of air is 1.5 to 4.5 times more in amount than the first draft of air.

20. The method according to claim 18, wherein the air is exhausted from the space in an amount larger than the air supplied into the space.

21. The method according to claim 20, wherein the air supplied is 30 to 70% in amount with respect to the air exhausted.

* * * * *